United States Patent [19]

Smies

[11] Patent Number: 5,439,945

[45] Date of Patent: Aug. 8, 1995

[54] FOAMS PRODUCED UNDER REDUCED PRESSURE AND METHOD OF PREPARING SUCH FOAMS

[76] Inventor: John R. Smies, W-1623 Smies Rd., Oostburg, Wis. 53070

[21] Appl. No.: 179,091

[22] Filed: Jan. 10, 1994

[51] Int. Cl.⁶ .............................. C08J 9/00; C08J 9/08
[52] U.S. Cl. ...................... 521/50; 264/45.1; 264/48; 428/304.4; 521/79; 521/142; 521/143; 521/146; 521/149; 521/155; 521/180; 521/189
[58] Field of Search ............. 521/50, 51, 50.5, 110, 521/134, 136, 137, 138, 189, 149, 180, 146, 155, 79, 143; 264/45.1, 48; 428/304.4

[56] References Cited

U.S. PATENT DOCUMENTS

| | | |
|---|---|---|
| 4,223,068 | 9/1980 | Carlstrom et al. . |
| 4,417,001 | 11/1983 | Svoboda et al. . |
| 4,444,919 | 4/1984 | Brennan . |
| 4,469,824 | 9/1984 | Grigsby, Jr. et al. . |
| 4,604,410 | 8/1986 | Altenberg . |
| 4,710,521 | 12/1987 | Soukup et al. . |
| 4,743,417 | 5/1988 | Bakkelunn ........................... 521/51 |
| 5,137,929 | 8/1992 | Demmin et al. ................... 521/117 |

*Primary Examiner*—Joseph L. Schofer
*Assistant Examiner*—John M. Cooney, Jr.
*Attorney, Agent, or Firm*—Foley & Lardner

[57] ABSTRACT

Foams are prepared under reduced pressure and are subsequently encased in a material which will prevent ambient air from entering the cell voids. In the most preferred embodiment of the invention a polyurethane or polyisocyanurate foam is formed by mixing the polyol and isocyanate components under reduced pressure, allowing the gas within the foam to reach equilibrium at a lesser pressure then in prior systems. The need for blowing agents is substantially reduced and the K-factor of such foams is highly desirable. The foams are particularly well suited for use in refrigeration applications where the foams can be encased to prevent air from entering the cells after curing of the foam.

11 Claims, 1 Drawing Sheet

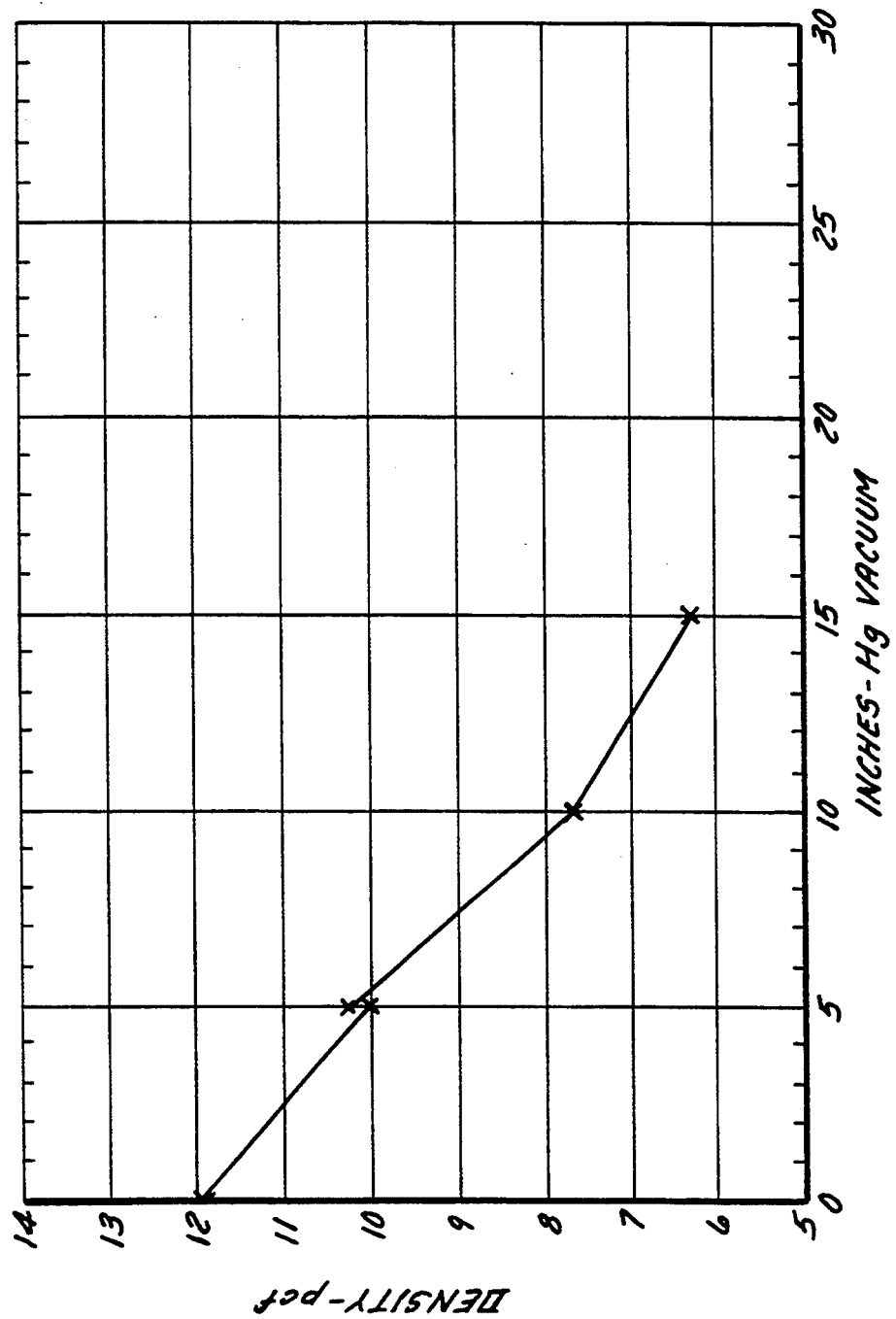

FOAMS PRODUCED UNDER REDUCED PRESSURE AND METHOD OF PREPARING SUCH FOAMS

BACKGROUND OF THE INVENTION

1. Field of the Invention

The present invention relates generally to the art of synthetic foams and more particularly to foams used, for example, in refrigeration and other thermal insulation applications. In its most preferred embodiment, the present invention relates to urethane or polyisocyanurate foams of the type previously blown with solvent or $CO_2$. Still more specifically the present invention relates to such foams prepared under reduced pressure. In its most preferred form, the present invention relates to foams produced under reduced pressure and the encasement of such foams in materials which will prevent ambient air from entering the foam voids, thereby maintaining a reduced pressure within the voids thereby enhancing the K-factor and minimizing the need, in some applications, for the use of blowing agents which are detrimental to the environment.

2. Description of the Prior Art

Many different types of foams are known in the art for use in refrigeration and other applications where thermal insulation is desired. A myriad of other applications also exist for such foams. Foam preparation, in and of itself, is well known to those skilled in the art and the starting materials can vary widely. Polystyrene foams have been used for applications such as drinking cups, food containers, household articles and the like. Urethane and polyisocyanurate foams have been known for many years and are especially effective for applications where it is desired to provide a thermal barrier. Typically applications include building panels, refrigeration insulation, the use of such foams in coolers, drink holders, vacuum bottles, and the like. While the remainder of the application will focus on the use of the present invention in the field of urethane and isocyanurate foams, it should be understood from this point forward that the invention is not to be limited to such foams but may be used with other types of foams, including the polystyrene previously mentioned as well as polyethylene, foaming synthetic rubber foam, etc. Once the principals of the present invention are understood by those skilled in the art, it will be readily appreciated how the improvements of the present invention may be incorporated into other foam preparation systems.

In the case of polyurethane and polyisocyanurate foams, a variety of starting materials are disclosed in the prior art, including the prior art patents discussed below. In a common system, two components are used, one of the components being an organic polyol and the other being an organic polyisocyanate. Halogenated alkane blowing agents may be added to the system to result in what have come to be known as "solvent" blown systems. Typical of such blowing agents are Freon-11®, Freon-12® and Freon-141b®. In the manufacture of this type of foam, the reaction of the polyisocyanate and the polyol results in the formation of heat which causes rapid evaporation of the blowing agent and the creation of cell voids while the foam is in a plastic or uncured condition. Other typical starting materials for these types of foams include surfactants and catalysts for the reaction of the polyol and isocyanate radicals of the starting materials.

An alternative to the use of solvents is the use of "water" blown systems, wherein water is added to the polyol component, which in turn reacts with the isocyanate radicals of the polyisocyanate to produce carbon dioxide.

In either of the above cases, and in the case of the preparation of other types of foams in which a blowing agent or gas is created in situ during form formation, the gas in the resin expands as it approaches an equilibrium pressure with the atmosphere. When the foam has risen and the plastic resin has been cured, the cells of the foam will be filled with whatever gas has been used to form them. The conductivity of the resultant foam will then be a summation of the conductivity of the organic resin components of the foam combined with the conductivity of the particular gas which has been involved.

Several difficulties have arisen, especially in recent years, with such foams and especially in the use of blowing agents which include chlorinated solvents. Much attention has been directed toward the elimination of such blowing agents, leaving the industry to develop techniques for maintaining suitable K-factors in foams used for a variety of important commercial applications. Tradeoffs are encountered with current technology, in that reduced K-factors may result in higher electrical costs in application such as refrigeration. Similarly, if the foam was used in building insulation panels, lower K-factors would result in higher heating and cooling requirements for a particular building or thicker layers of the foams, also involving a tradeoff in manufacturing costs and space requirements, would be required.

The following U.S. Patents disclose various foam forming components which would be useful in forming the improved foams of the present invention. They are disclosed here in lieu of detailed descriptions of the mechanisms of foam formation and in lieu of detailed listings of those catalysts, surfactants, polyols and polyisocyanates which have been heretofore used in the art. These patents, which are representations of the art, should be taken as illustrative rather than limiting.

The patents include Carlstrom et al. U.S. Pat. No. 4,223,068 issued Sep. 16, 1980 for "Rigid Polyurethane Foam Containing Polyester Residue Digestion Product and Building Panel Made Therefrom"; U.S. Pat. No. 4,444,919 issued Apr. 24, 1984 to Brennan for "Use of Polyethylene Terephthalate Liquid Waste Streams Containing Glycols as Rigid Polyol Extenders"; U.S. Pat. No. 4,710,521 issued Dec. 1, 1987 to Soukup et al. for "Catalyst Mixtures for Polyisocyanurate Foam"; U.S. Pat. No. 4,604,410 issued Aug. 5, 1986 to Altenberg for "Manufacturing of Rigid Foam Using Etherified Modified Aromatic Polyols"; Grigsby, Jr. et al. U.S. Pat. No. 4,469,824 issued Sep. 4, 1984 for "Liquid Terephthalic Ester Polyols and Polyisocyanurate Foam Therefrom", and U.S. Pat. No. 4,417,001 issued Sep. 22, 1983 to Svoboda et al. for "Low Smoke Isocyanurate Modified Urethane Foam and Method of Making Same." The latter patent is representative of several within the foregoing group which employ waste streams or recovered materials for use in the polyol component of the foam. These particular materials when used in the present invention provide the dual environmental advantage of recovery or recycling, as well as the elimination of harmful blowing agents.

A method for preparing foams, and the foam product prepared by the method, which would result in foams having desirable K-factors and which would eliminate the undesirable blowing agents used in the prior art would represent a significant advance in this art.

SUMMARY OF THE INVENTION

The present invention features a foam having desirable K-factors and which is prepared without the use of chlorinated blowing agents. The present invention further features a foam having K-factors comparable to those prepared using chlorinated blowing agents.

The present invention further features a foam which is especially suitable for use as an insulation foam, such as for use in refrigeration and applications and which has enhanced flow characteristics.

The present invention also features a method for preparing foams which results in foams having a desirable insulation values and structural integrity.

How the present invention accomplishes the features set forth above, and others which will appear to those skilled in the art after reading the present specification, will be disclosed in connection with the following detailed description of the preferred embodiment of the present invention, taken in conjunction with the FIGURES. Generally, however, the features are accomplished by employing a method to produce foams wherein the foam is formed under reduced pressure, thereby allowing the voids in the cell to reach a desirable size without full atmospheric pressures opposing such formation. Foams prepared under reduced pressure will require less pressure to achieve equilibrium and will require less gas to produce a given density foam. The lower level of gas within the cell voids will give a lower K-factor, because the cell pressure can be allowed to approach a vacuum condition. In the most preferred form of the present invention, the features are accomplished by encasing such foam in a gaseous impermeable material so that the high insulation values obtained during the manufacturing process will be retained over time. Refrigeration applications are ideal for the present invention, so are other applications where it is desired to utilize the thermal barrier characteristics of the foam and where encasement of the foam would not detract from the commercial viability of the present invention. Other ways in which the present invention achieves the features set forth above will become apparent to those skilled in the art. Such other ways are deemed to fall within the scope of the present invention.

DESCRIPTION OF THE DRAWINGS

The FIGURE is a graph of foam density in pounds per cubic foot versus inches of mercury (vacuum) for one preferred foam prepared according to the present invention.

DETAILED DESCRIPTION OF THE PREFERRED EMBODIMENT

Before proceeding to a detailed description of some of the more specific aspects of the preferred embodiment, comments should be made here about the general applicability and scope of the invention. First, while it has been mentioned previously, it should be clearly understood that the invention has applicability for foam systems other than urethane and polyisocyanurate foams, including polystyrene foams, polyethylene foams, polyurea, phenolic, epoxy, polypropylene foams, solvent blown foams various synthetic rubber foams, and even inorganic foams, all of which are known in the art. Moreover, the present invention can be employed in combination with foam systems previously known to provide improvements thereto. For example, while it is most desirable to eliminate solvent blowing agents, and the present invention is believed to result in foams which provide comparable insulations values to those which employ solvent blowing agents, solvent blown systems of the prior art would benefit from the techniques of the present invention in that less solvent would be required if the cells are formed under reduced pressure.

With regard to materials used in testing to date, the CHEMPOL ® urethane foam systems manufactured and sold by Cook Composites and Polymers of Kansas City, Mo. have been employed. One representative system is described in the attached product literature entitled 032-1762/032-1617 and dated January 1989. In this system, a $CO_2$ blown foam formulation includes a polyol material 032-1762 and an isocyanate component 032-1617. Various characteristics, resin properties, mix ratios and foam properties are disclosed in the technical literature. Variations can be made in the amount of water included with the 032-1762 material, as would be readily appreciated by those skilled in the art, to change the free-rise density of the resultant foam.

Proceeding now to the description of the invention, reference should first be made to FIG. 1 to show the density of foams created at various vacuum levels using the polyurethane system described above. The foam density was approximately 12 pounds per cubic foot at atmospheric pressure but only about 6 pounds per cubic foot at 15 inches of Mercury. FIG. 1 also shows results at 5 and 10 inches of mercury, yielding a relatively linear relationship between the four points tested. When this material was tested for K-factor, it was determined that the resultant foam gave thermal losses comparable to those using Freon-11 ® as a blowing agent, while prior testing had indicated that much thicker foams were required to provide comparable thermal efficiency in water blown systems. For example, in one set of tests, a 2.8 pound per cubic foot foam system blown with Freon-11 ® was comparable in thermal loss to a 4 pound per cubic foot water blown system.

Following preparation of the foam in a chamber which has been evacuated to some degree, equilibrium will be subsequently established within the foam voids and the atmosphere, unless an encasement of some type is provided around the foam. The rate at which equilibrium would be established will, of course, vary with the type of materials used to prepare the foam. The encasement can be provided in a variety of ways, such as by using metal panels, plastic sheeting or a liquid coating which cures to a gas impermeable layer. The material should prevent atmospheric air from contacting the surface of the foam and penetrating into the voids. Encasement may not be necessary for some foams, e.g. an inorganic glass foam, where the material used is impervious to air flow.

Such encased foam could be used in appliances such as refrigerators and freezers or could be used in other systems wherein it is desired to provide an efficient thermal barrier. Another example would be vacuum beverage containers and coolers wherein relatively thin layers of foam are employed and foam encasements are already used.

The particular way in which the foam is prepared under vacuum is not critical to the invention and will vary widely depending on the size and shape of the final product. It is simplest to indicate that the reactants will be brought together in an area which is enclosed. A vacuum is drawn in the area, preferably greater than 15 inches of mercury (although higher or lower vacuum can be employed, with the limits determined by the amount of cell void pressure reduction desired, on the one hand, and the complexity of the vacuum equipment and the area enclosure on the other). After the foam is formed, its "skin" will protect the inner cell from achieving rapid equilibrium with ambient conditions for a period of time, during which the encasing material is added.

The foam forming process of the present invention is especially advantageous in the formation of certain difficult to prepare parts. This is due to the enhanced flow characteristics under negative pressure making cavities easier to fill and flow into mold constructions, cavities and the like easier.

While the invention has been described in connection with one specific foam system for illustrative purposes only, the amount of vacuum is not critical, and improvements will result from any reductions in pressure. Vacuum in excess of 5 inches of mercury vacuum is preferred, while 25 inches or more is highly desirable to give lower density and better flow properties. Routine experimentation may dictate the amount of vacuum which may be needed for particular applications. Accordingly, the invention is to be limited only by the scope of the claims which follow.

I claim:

1. A method for preparing an insulation foam wherein one or more polymeric foam forming materials are reacted under foam forming conditions and wherein cell voids are created in the foam during the reaction, the improvement comprising the steps of:
   causing the foam forming materials to react in an area to form cell voids;
   maintaining a negative pressure condition in the area during the time the reaction is occurring; and
   encasing the resultant polymeric foam in a gas impermeable material wherein the negative pressure in the cell voids is maintained.

2. The method of claim 1, wherein the negative pressure condition is created by drawing a vacuum in the area.

3. The method of claim 2, wherein the vacuum is greater than 5 inches of mercury.

4. The method of claim 2, wherein the vacuum is in the range of about 5-25 inches of mercury.

5. The method of claim 1, wherein the foam forming materials are selected from the group consisting of the materials required to form urethane, polyisocyanurate, polyurea, polystyrene, polypropylene phenolic, epoxy, and polyethylene foams.

6. The method of claim 1, wherein the foam forming materials include a polyol, an isocyanate, a catalyst, and wherein the polyol includes water so that the reacted foam is a $CO_2$ blown foam.

7. An insulating foam formed by the process which comprises reacting one or more polymeric foam forming materials under foam forming conditions to create a cured foam which includes cell voids and wherein the reaction takes place in an area in which a negative pressure exists during the time the reaction is occurring; and
   wherein the foam includes a gas impermeable encasement surrounding the foam to prevent ambient gases from penetrating the polymeric foam and equalizing the pressure in the cell voids with the ambient pressure and wherein the negative pressure in the cell voids is maintained.

8. The foam of claim 7, wherein a vacuum is drawn in the area during the time the foam forming reaction is occurring.

9. The foam of claim 8, wherein the vacuum exceeds 5 inches of mercury.

10. The foam of claim 7, wherein the foam forming materials are selected from the group consisting of the materials required to form urethane, polyisocyanurate, polyurea, polystyrene, polypropylene, phenolic, epoxy, and polyethylene foams.

11. The foam of claim 7, wherein the foam forming materials include a polyol, an isocyanate, and a catalyst and wherein the polyol includes water so that the reacted foam is a $CO_2$ blown foam.

* * * * *